J. B. BARTHOLOMEW.
COMBINED FLY AND STARTING WHEEL FOR INTERNAL COMBUSTION ENGINES.
APPLICATION FILED JULY 30, 1912.
1,204,839. Patented Nov. 14, 1916.
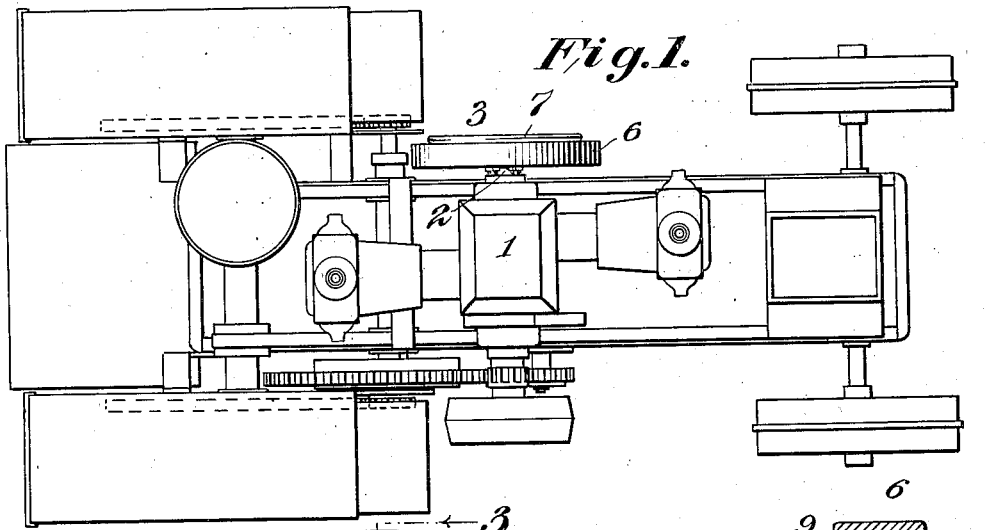
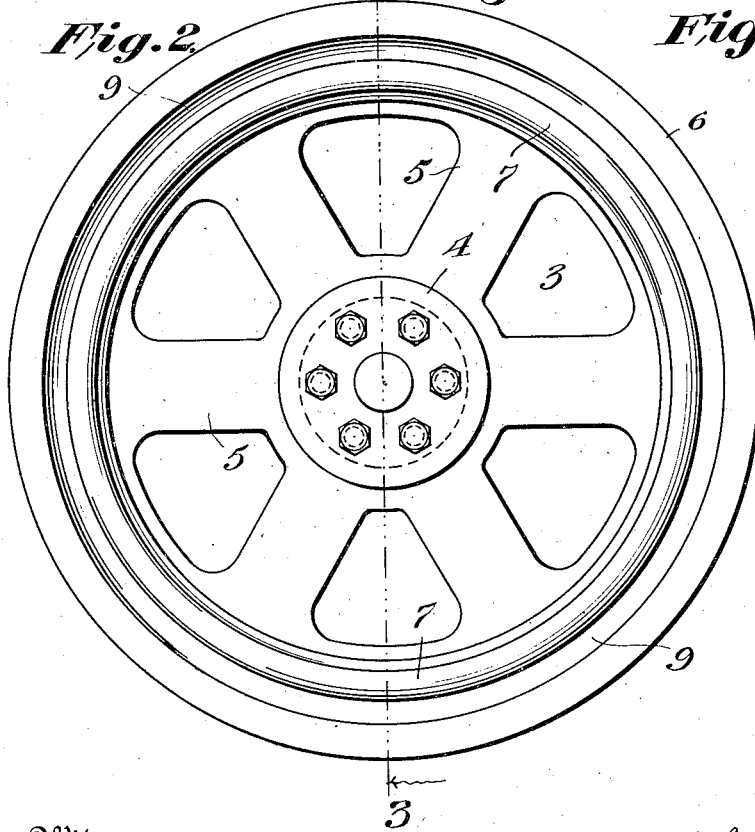
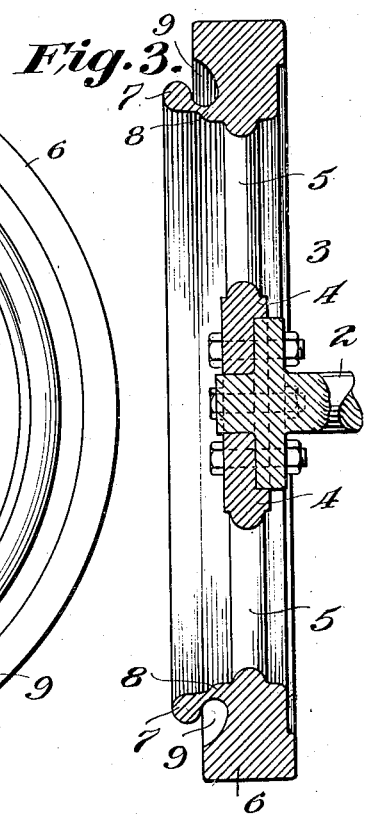
Witnesses
H. H. Lybrand
S. Jay Teller
Inventor
John B. Bartholomew
By H. H. Bliss
Attorney

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

COMBINED FLY AND STARTING WHEEL FOR INTERNAL-COMBUSTION ENGINES.

1,204,839.

Specification of Letters Patent.

Patented Nov. 14, 1916.

Application filed July 30, 1912. Serial No. 712,288.

*To all whom it may concern:*

Be it known that I, JOHN B. BARTHOLOMEW, a citizen of the United States, residing at Peoria, in the county of Peoria and State of Illinois, have invented certain new and useful Improvements in Combined Fly and Starting Wheels for Internal-Combustion Engines, of which the following is a specification, reference being had therein to the accompanying drawing.

The object of the invention is to provide for an internal combustion engine a combined fly and starting wheel of improved construction.

I am aware that it is common practice with internal combustion engines to start them by manually gripping the fly wheel to turn it, but the ordinary fly wheel is not adapted to be easily grasped and is of such construction that there is considerable danger of injury to the operator when the engine starts suddenly.

By my invention I have provided a wheel having a large, thick rim section having the required inertia and a relatively small hand grip section connected with the main part of the wheel by a continuous annular web, there being no parts adjacent the hand grip section with which the operator's hand can come in contact to be injured.

In the accompanying drawings, which show the form of my invention which I now prefer, Figure 1 is a plan view showing more or less diagrammatically an internal combustion engine having a fly and starting wheel constructed in accordance with my invention. Fig. 2 is a side view of the wheel. Fig. 3 is a cross-sectional view of the wheel taken along the line 3—3 of Fig. 2.

Referring to the drawings, 1 represents as a whole an internal combustion engine, which may be of any usual or preferred type and need not here be described in detail. The engine is provided with a main crank or drive shaft 2 upon which is mounted a wheel, indicated as a whole by 3. The wheel 3 has a hub 4 and spokes 5, 5, which may be of any usual or preferred form. The rim of the wheel is preferably formed integrally with the spokes and has a main, heavy fly section 6. At one side of the main rim section 6 is a ring or hand grip 7 which is connected with the main part of the rim by a continuous unbroken web 8. For the sake of compactness the rim section 7 is preferably located close to the main section 6 and the annular groove 9 is formed in the main section to give room for the operator's fingers.

In operation, when the engine is ready for starting the operator simply takes hold of the rim or hand-grip section 7 with both hands and by means of it gives the fly wheel and the engine shaft a quick turn. If the engine does not start at the first turn the operator, by permitting the ring section to slip in his hands, can repeatedly grip it and keep the wheel and engine in motion.

It will be noted that the groove 9 is continuous and has a smooth unbroken surface, there being no openings either in the main rim section 6 or in the web 8. The main spokes 5 of the wheel are not close to the hand grip section 7 and there is therefore no part which can catch the operator's hands to cause injury.

What I claim is:—

1. A combined fly and starting wheel for internal combustion engines, the same being formed with a heavy rim, a hub, spokes connecting the hub and rim, and a concentric hand grip of less diameter than the rim whereby the wheel may be manually turned, said hand grip being circumferentially continuous and smooth, and the part by which it is united with the rim being also circumferentially continuous and smooth, and said hand grip extending from the inner part of the rim laterally and away from the axis of the wheel to points remote from the spokes; whereby said grip may be grasped at its upper part or sides, with the fingers between the grip and the rim and with the palms of the hands at the inner side of the said grip.

2. A combined fly and starting wheel for internal combustion engines, the same being formed with a heavy rim, a hub, spokes connecting the hub and rim, and a concentric hand grip whereby the wheel may be manually turned, said hand grip being circumferentially continuous and smooth, and the part by which it is united with the rim being also circumferentially continuous and smooth, and said hand grip extending from the rim laterally to points remote from the spokes; whereby said grip may be grasped at its upper part or sides, with the palms of the hands at the inner side of the said grip.

3. A combined fly and starting wheel for internal combustion engines, the same being formed with a heavy rim, a hub connected with the rim, and a concentric hand grip whereby the wheel may be manually turned, said hand grip being circumferentially continuous and smooth, and the part by which it is united with the rim being also circumferentially continuous and smooth; whereby said grip may be grasped at its upper part or sides, with the palms of the hands at the inner side of said grip.

In testimony whereof, I affix my signature, in presence of two witnesses.

JOHN B. BARTHOLOMEW.

Witnesses:
J. M. CALDWELL,
A. L. GREGORY.